United States Patent
Friberg et al.

(10) Patent No.: US 6,836,330 B2
(45) Date of Patent: Dec. 28, 2004

(54) OPTICAL BEAMSPLITTER FOR A POLARIZATION INSENSITIVE WAVELENGTH DETECTOR AND A POLARIZATION SENSOR

(75) Inventors: Stephen R. Friberg, Mountain View, CA (US); Charles C. Harb, Sunnyvale, CA (US)

(73) Assignee: Lambda Control, Inc., Sunnyvale, CA (US)

( * ) Notice: Subject to any disclaimer, the term of this patent is extended or adjusted under 35 U.S.C. 154(b) by 363 days.

(21) Appl. No.: 10/112,985

(22) Filed: Mar. 28, 2002

(65) Prior Publication Data

US 2002/0126288 A1 Sep. 12, 2002

Related U.S. Application Data

(63) Continuation-in-part of application No. 09/954,086, filed on Sep. 17, 2001.
(60) Provisional application No. 60/233,836, filed on Sep. 19, 2000.

(51) Int. Cl.[7] .............................................. G01N 21/25
(52) U.S. Cl. ...................... 356/419; 356/416; 250/225; 250/226
(58) Field of Search .............................. 356/419, 416, 356/402, 364; 372/32; 250/225, 226

(56) References Cited

U.S. PATENT DOCUMENTS

| | | | |
|---|---|---|---|
| 4,309,604 A | * | 1/1982 | Yoshikawa et al. ......... 250/226 |
| 4,309,671 A | | 1/1982 | Malyon |
| 4,904,088 A | * | 2/1990 | Blazek et al. ............... 356/402 |
| 5,515,169 A | * | 5/1996 | Cargill et al. ............... 356/417 |
| 5,706,301 A | | 1/1998 | Lagerström |
| 5,729,347 A | | 3/1998 | So |
| 5,760,419 A | | 6/1998 | Nabiev et al. |
| 5,777,763 A | | 7/1998 | Tomlinson, III |
| 5,798,859 A | | 8/1998 | Colbourne et al. |
| 5,825,792 A | | 10/1998 | Villeneuve et al. |
| 5,850,292 A | | 12/1998 | Braun |
| 5,963,686 A | | 10/1999 | Zheng et al. |
| 6,005,995 A | | 12/1999 | Chen et al. |
| 6,046,813 A | | 4/2000 | Naganuma |
| 6,088,142 A | | 7/2000 | Cao et al. |
| 6,094,271 A | | 7/2000 | Maeda |
| 6,122,301 A | | 9/2000 | Tei et al. |
| 6,178,002 B1 | | 1/2001 | Mueller-Wirts |
| 6,212,210 B1 | | 4/2001 | Serizawa |
| 6,215,801 B1 | | 4/2001 | Ackerman et al. |
| 6,233,263 B1 | | 5/2001 | Chang-Hasnain et al. |
| 6,243,403 B1 | | 6/2001 | Broutin et al. |

FOREIGN PATENT DOCUMENTS

EP 0516318 A2 12/1992

\* cited by examiner

*Primary Examiner*—Frank G. Font
*Assistant Examiner*—Roy M. Punnoose
(74) *Attorney, Agent, or Firm*—Dorsey & Whitney LLP

(57) ABSTRACT

A wavelength detector is described. The wavelength detector includes a beamsplitter having a wedged back surface with respect to the front surface to reflect the incoming optical signal into two paths. Filters, at least one of which varies with wavelength of the optical signal are in each of the said paths. The filtered light in the two paths is detected by a photodetector and the output electrical signals are log amplified. The log amplified signals are applied to a difference amplifier whose output is indicative of the wavelength or polarization of the incident optical signal.

10 Claims, 5 Drawing Sheets

# OPTICAL BEAMSPLITTER FOR A POLARIZATION INSENSITIVE WAVELENGTH DETECTOR AND A POLARIZATION SENSOR

RELATED APPLICATION

This application is a continuation-in-part of application Ser. No. 09/954,086 filed Sep. 17, 2001, which application claims priority to Provisional Application Ser. No. 60/233,836 filed Sep. 19, 2000.

FIELD OF THE INVENTION

This invention relates generally to a wavelength detector and a polarization sensor that can be used to measure the wavelength or the polarization state of a monochromatic optical signal. Specifically, it provides a means to adjust the properties of a beamsplitter so that it is better suited to either one or the other task. This invention can be used in the fields of optics, telecommunications, and laser spectroscopy.

BACKGROUND OF THE INVENTION

Wavelength measurement devices that are used to detect, monitor and control a laser's wavelength and polarization are emerging as integral components of laser optical systems. There are growing demands for wavelength and polarization measurement devices because the telecommunications, spectroscopic, and analytical chemistry industries have grown to the point where accurate management of these properties is essential. The development of dense wavelength division multiplexing (DWDM) systems in telecommunications, and high sensitivity spectroscopic systems in analytical chemistry has led to a demand for wavelength and polarization measurement and control systems that are fast, accurate, give real time wavelength readouts, and are inexpensive.

In optical telecommunications systems, for example, the laser light sources have to be held to a wavelength that moves by less than 1 GHz and at a constant polarization if they are to operate in DWDM systems that have wavelength spacings of 100 GHz or less. This process is achieved using wavelength and polarization measurement devices that samples the output of a laser and provide a signal that can be used to adjust the laser's properties to the correct value and limit its deviation from that value. Additionally, wavelength measurement devices are used to accurately switch the laser wavelength from one telecommunications channel (ITU channel) to another while maintaining the polarization state. Rapid and accurate wavelength switching (microseconds to nanosecond switching times) over a wide wavelength range (40 nm at 1550 nm) is emerging as a new, and essential requirement for DWDM systems.

In spectroscopy and analytical chemistry, concentrations of chemical constituents or molecular and atomic components can be easily and inexpensively measured with tunable diode lasers provided there exists an accurate and reasonably rapid means to tune the laser to the required wavelength.

Furthermore, the polarization of the laser light on entrance and exit of an optical system needs to be monitored and controlled so that its trajectory through the system can be optimized.

Historically, wavelength measurements have been performed in several ways.

1. A prism or diffraction grating is used to disperse different wavelengths into different directions, each direction corresponding to a unique wavelength. By scanning the directions with a slit and a detector sensitive to light intensity, the wavelength properties of an optical signal can be determined.

2. Alternatively, a scanning optical interferometer can be employed, typically a Michelson interferometer. The wavelength of an optical signal is determined by changing the length of the interferometer by a known amount, and counting the number of interference fringes (a narrow bandwidth optical signal is assumed).

To determine the wavelength of an optical signal with very high accuracy, these measurement techniques must be augmented by a calibration measurement where:

a) the unknown wavelength is compared to a spectroscopic signal; or b) the unknown wavelength is compared to stabilized laser signal.

Both measurement methods required mechanical movement. Therefore, considerable time is required for the measurement to be performed, typically on the order of seconds. Also, due to requirements for stable mechanical accuracies at micron dimensions, expensive and bulky mechanical components are required. With accurate calibration, great accuracies can be achieved with these techniques, better than $1*10^{-13}$ meter resolution, however the time to take the measurements limited their usage in many applications. The need for mechanical stability and repeatability, combined with the complexity of calibration measurements, ensures that the measurement devices are bulky and costly, restricting their usage.

Methods have been developed that partially solve some of these problems. If measurements are to be performed on a monochromatic signal (i.e., one where the bandwidth is very small compared to the center frequency) at a specific wavelength, a dielectric bandpass filter or a Fabry-Perot etalon can be used in place of a wavelength reference. When an optical signal is incident on a dielectric filter or a Fabry-Perot etalon at or near a resonance, transmission through (or reflection from) the filter or etalon is determined by the wavelength of the optical signal and the resonant characteristics of the dielectric filter or etalon. This is illustrated in FIGS. 1 and 2 which show a dielectric filter 11a, FIG. 1, and an etalon 11b, FIG. 2, in a wavelength measurement system. The light beam is applied to a beamsplitter 12. Light from the beamsplitter is applied directly to photodiode 13 and to a second photodiode 14 after it has been transmitted (or reflected) by the dielectric filter 11a or etalon 11b. The outputs of the photodiodes are then compared. The use of a beamsplitter and photodiodes eliminates any error due to changes in beam intensity. A measurement of the transmission (or reflection) therefore determines the wavelength of the light, except that the same transmission (or reflection) can correspond to different wavelengths. When the wavelength of the source is approximately known, as is sometimes the case, this is not a problem. More generally, it means that the wavelength has been determined to be one of several values. For the case of a dielectric bandpass filter with a single transmission peak, the wavelength is determined to be one of two values. In the case of a Fabry-Perot etalon with multiple resonances, the wavelength can be one of multiple values.

These methods make possible wavelength locking of a monochromatic laser light source to a desired wavelength. When the wavelength of the source differs from the desired wavelength, that selected by the filter or etalon, the transmission of the light through the filter or etalon differs from the desired transmission as determined by the output of the two photodiodes. The difference is used to provide an error correction signal that can be used to adjust the wavelength of the laser source to the correct value.

If a bandpass dielectric filter is used for wavelength measurement or wavelength locking, the disadvantage is that it works over a limited wavelength range (typically <2 nm). This means that it cannot be used for applications such a tunable telecommunications lasers where wide wavelength tunability is an important requirement. It also has the disadvantage that the wavelength resolution is dependent on the quality of the thin film coating, which often has ripple or etalon effects that limit the accuracy with which the transmission can be measured.

If a Fabry-Perot etalon is used for wavelength measurement or wavelength locking, it allows wavelength measurement and wavelength locking at a number of different wavelengths corresponding to different resonances of the Fabry-Perot. A disadvantage is that measurement accuracies are restricted by mechanical and thermal stability. Another disadvantage is that Fabry-Perot etalon have multiple resonant transmission peaks and therefore multiple wavelengths that give the same transmission. Thus, the absolute wavelength of the measurement cannot be determined. An additional disadvantage is that the measurement accuracy obtainable with an etalon is very poor at wavelengths situated halfway between its resonances. For telecommunications systems, Fabry-Perot etalon dimensions are inversely proportional to channel spacings.

Polarization sensors have been either devices that preferentially direct one polarization of light along one trajectory and the other polarization along a second path, or devices that only allow one polarization to pass and destroy the other. Both of these devices are susceptible to laser intensity noise, as they both determine the best orientation of the laser polarization with respect to the device by measuring the intensity of the field that is transmitted.

Objects and Advantages of the Invention

It is an object of the present invention to provide an apparatus and method that overcomes many of the foregoing problems. One set of advantages of the present invention is that the wavelength readout signal is monotonically related to the wavelength of the incident beam over ranges that can be in excess of 40 nm, is stable to better than ±7 pm over this range, and with minor improvements could reach <±3 pm without altering the optical path length, and the speed at which wavelengths are read is only limited to the speed of the photodetection system.

Other objects of the present invention are:
a) to provide an inexpensive apparatus and method for measuring the wavelength or the polarization of light,
(b) to provide apparatus for measuring the wavelength or the polarization of light that can be readily miniaturized,
(c) to measure the wavelength or the polarization of light without knowing the approximate wavelength or the polarization in advance,
(d) to provide a feedback signal that can be used to lock the wavelength output or the polarization state of an optical light source such as a single-mode laser or optical parametric oscillator,
(e) to provide an inexpensive means for measuring the wavelength or the polarization of optical signals from spectroscopic sources used in environmental and chemical analysis,
(f) to provide a means for measuring the wavelength or the polarization fluctuations of a light source, and
(g) to provide a means for measuring the wavelength irrespective of the polarization of the laser light that is incident on the unit,
(h) to provide a means for measuring the polarization of a light field irrespective of the wavelength of the laser light that is incident on the unit.

SUMMARY OF THE INVENTION

The objectives and advantages of the invention are achieved by an optical measurement system that directs the laser light into two predetermined paths that travel through a beamsplitter configuration that is optimized for wavelength monitoring or polarization monitoring. The light in each of the paths is detected by a photodetector that provides photocurrent that is received by log amplifiers which provide the logarithm of the photocurrent intensity. A subtractor receives the log outputs of the two photocurrents and provides a signal indicative of wavelength or polarization of the laser, depending on the beamsplitter characteristics.

More particularly, the apparatus includes an optical system comprising an optical beamsplitter that divides the incident laser beam into two beams; one spectral filter that acts to reflect the longer laser wavelengths more strongly than the shorter wavelengths, or a mirror that reflects all of the light of the first beam; one spectral filter that acts to reflect the shorter laser wavelengths more strongly than the longer wavelengths, or a mirror that reflects all the light of the second beam; photodetectors to capture the light from the two beam paths and generate photocurrents; log-amplifiers for receiving said photocurrents and providing the logarithm of the two photocurrents; and a subtractor for subtracting the logarithm of the two photocurrents and provide an output signal indicative of wavelength.

The analog electronic system may be comprised of one photodetector preamplifier for each of the photodetectors; one logarithmic amplifier for each of the photodetected signals; and a difference amplifier for subtracting the two logarithmic signals. A digital signal processing system can be used to replace the analog electronics, if the functionality is maintained.

DESCRIPTION OF THE FIGURES

The present invention will be better understood by reading the following detailed description in conjunction with the accompanying drawings in which.

DETAILED DESCRIPTION

Figure 1:
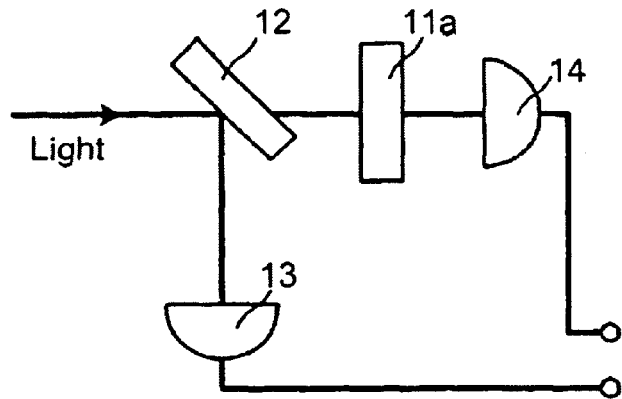
FIG. 1 is a schematic diagram of a prior art apparatus for measuring the wavelength of an optical signal.
Figure 2:
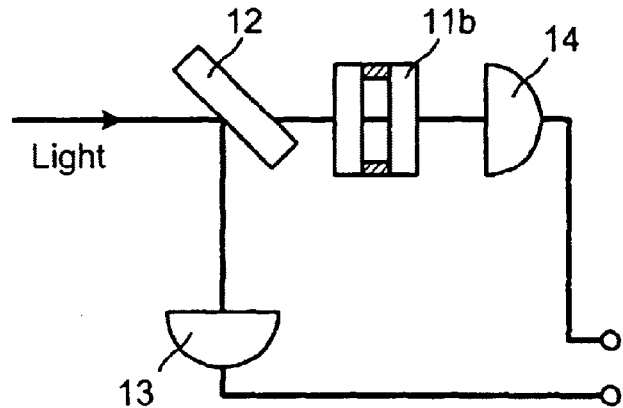
FIG. 2 is a schematic diagram of another prior art apparatus for measuring the wavelength of an optical signal.
Figure 3:
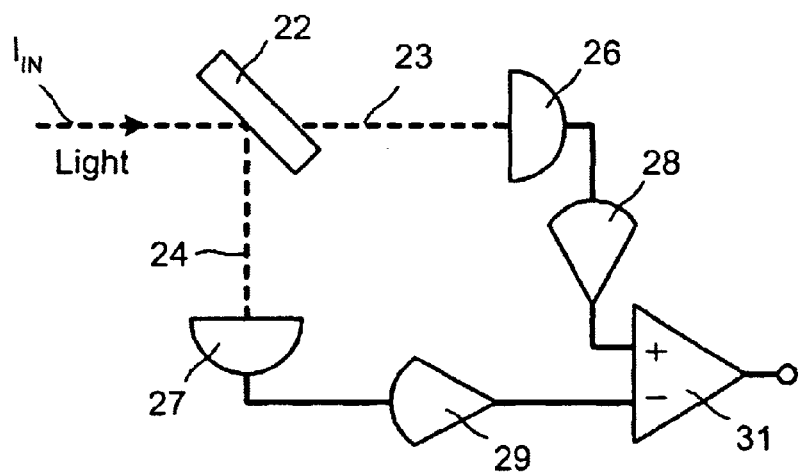
FIG. 3 is a schematic diagram of a detector for measuring the wavelength of an optical signal or beam in accordance with an embodiment of the invention.

FIG. 3 shows the basic optical and electrical components of a wavelength detector in accordance with one embodiment of the present invention. The detector is positioned to receive an optical signal (beam) $I_{in}$. The detector includes a beamsplitter 22 whose transmission varies with wavelength to form two beams 23 and 24. The beams are received by photodetectors 26 and 27. Analog log-amplifier circuits 28 and 29 receive the output of the photodetectors and provide the log of the current received from the photodetectors. The two log outputs are subtracted by subtractor or difference amplifier 31 to provide a signal representative of wavelength of the optical signal. This signal can then be used with a look-up table or the like to provide a measurement of wavelength.

Figure 4:
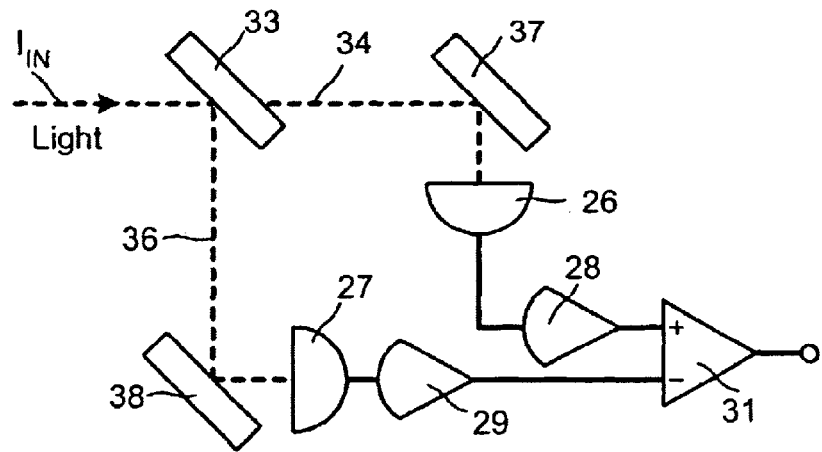
FIG. 4 is a schematic diagram of a detector for measuring the wavelength of an optical signal or beam in accordance with another embodiment of the invention.

FIG. 4 illustrates another embodiment of the invention where like parts have been given like reference numbers. In this embodiment, the beamsplitter 33 merely splits the input beam $I_{in}$ into two beams 34 and 36. The beams then impinge upon reflective filters 37 and 38 which are short-wavelength pass (SWP) and long-wavelength pass (LWP) filters which have reflection characteristics which vary with wavelength. The same results can be achieved by filters in which the transmission of short and long wavelength light varies with wavelength. The photodetectors and analog circuits are the same as described above with reference to FIG. 3 and bear the same reference numbers.

If we assume that the laser beam $I_{in}$, is split into two fields or beams 34 and 36, with beam intensities $(1-\eta)*I_{in}$ and $\eta*I_{in}$, where $\eta$ is the splitting ratio and is approximately equal to 0.5, and each beam is modified by the appropriate spectral filters 37, 38, then the resulting photocurrents are:

$$I_1 = I_{in}(I-\eta)F_1 \quad (1)$$

$$I_2 = I_{in}\eta F_2 \quad (2)$$

where $I_1$ and $I_2$ are the intensity of the output from the photodiodes 26 and 27.

Each of the two photo-currents are amplified and then converted to a logarithm by a logarithmic amplifiers 28, 29. The resulting voltages are then subtracted in subtractor 31.

$$\begin{aligned} I_{wd} &= \ln[I_{in}(1-\eta)F_1] - \ln[I_{in}\eta F_2] \quad (3) \\ &= \ln[(1-\eta)F_1] - \ln[\eta F_2] \\ &= \ln\left[\frac{(1-\eta)}{\eta}\right] - \ln\left[\frac{F_1}{F_2}\right] \end{aligned}$$

The output current $I_{wd}$ is indicative of wavelength.

Note that the signal $I_{wd}$ is independent of the laser intensity $I_{in}$. Also, $I_{wd}$ is dependent on the beamsplitter ratio, $\eta$, as well as the spectral filters F1 and F2. Thus, if any of these components vary in magnitude as a function of wavelength the output signal is indicative of wavelength or polarization.

Figure 7:
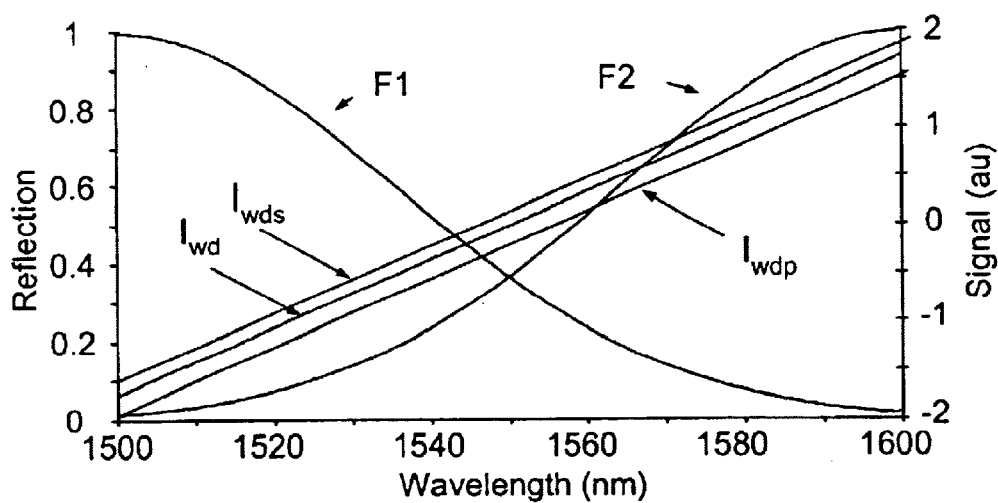
FIG. 7 shows the output signal as a function of wavelength for a detector using two filters having characteristics which vary with wavelength.

If the beamsplitter ratio is left constant, we can choose to vary the reflectance of the filters in the system as a function of wavelength in, for example, a Gaussian fashion. We can consider the case where 37 reflects the shorter wavelengths more strongly than the longer wavelengths, and 38 reflects the longer wavelengths more strongly than the shorter wavelengths. FIG. 7 shows the resulting wavelength detector signal $I_{wd}$ for this situation. Under these conditions, the signal is linear over the usable range of the filters. Thus, this system maximizes the useable range of the detector.

However, the beamsplitter ratio tends to be dependent on the polarization of the laser field. Thus, $\eta$ tend to be different for the s and p polarizations of the laser field and has values $\eta_s$ and $\eta_p$. The resulting wavelength detector signal becomes $I_{wds}$ and $I_{wdp}$, shown in FIG. 7. Thin film reflective coatings can be developed that maximize the difference between $\eta_s$ and $\eta_p$, but this is usually only possible over a small wavelength range.

Fresnel's laws of reflection precisely describe amplitude and phase relationships between reflected and incident light at a boundary between two dielectric media. It is convenient to think of incident radiation as the superposition of two plane-polarized beams, one with its electric field parallel to the plane of incidence (p-polarized) and the other with its electric field perpendicular to the plane of incidence (s-polarized). Fresnel's laws can be summarized in the following two equations which give the reflectance of the s- and p-polarized components:

$$r_s = \left[\frac{\sin(\theta_i - \theta_t)}{\sin(\theta_i + \theta_t)}\right]^2 \quad \text{Equation 4}$$

$$r_p = \left[\frac{\tan(\theta_i - \theta_t)}{\tan(\theta_i + \theta_t)}\right]^2 \quad \text{Equation 5}$$

Where $\theta_i$ is the angle of incidence of the laser field to the boundary and $\theta_t$ is the angle of transmission through the boundary. The relationship between $\theta_i$ and $\theta_t$ can be calculated using Snell's law. For an air/glass interface with the glass having a refractive index of 1.52, and at normal incident, the intensity of the reflected light will be 4% of the incident light. However, at all other incidence angles, the reflected s- and p-polarizations have different values. The conservation of energy also indicates that the transmitted s- and p-polarizations will also have different values. Therefore, a single dielectric interface cannot be used as a beamsplitter that produces a constant split ratio for all polarization states unless the field is incidence normal to the boundary.

Figure 5:
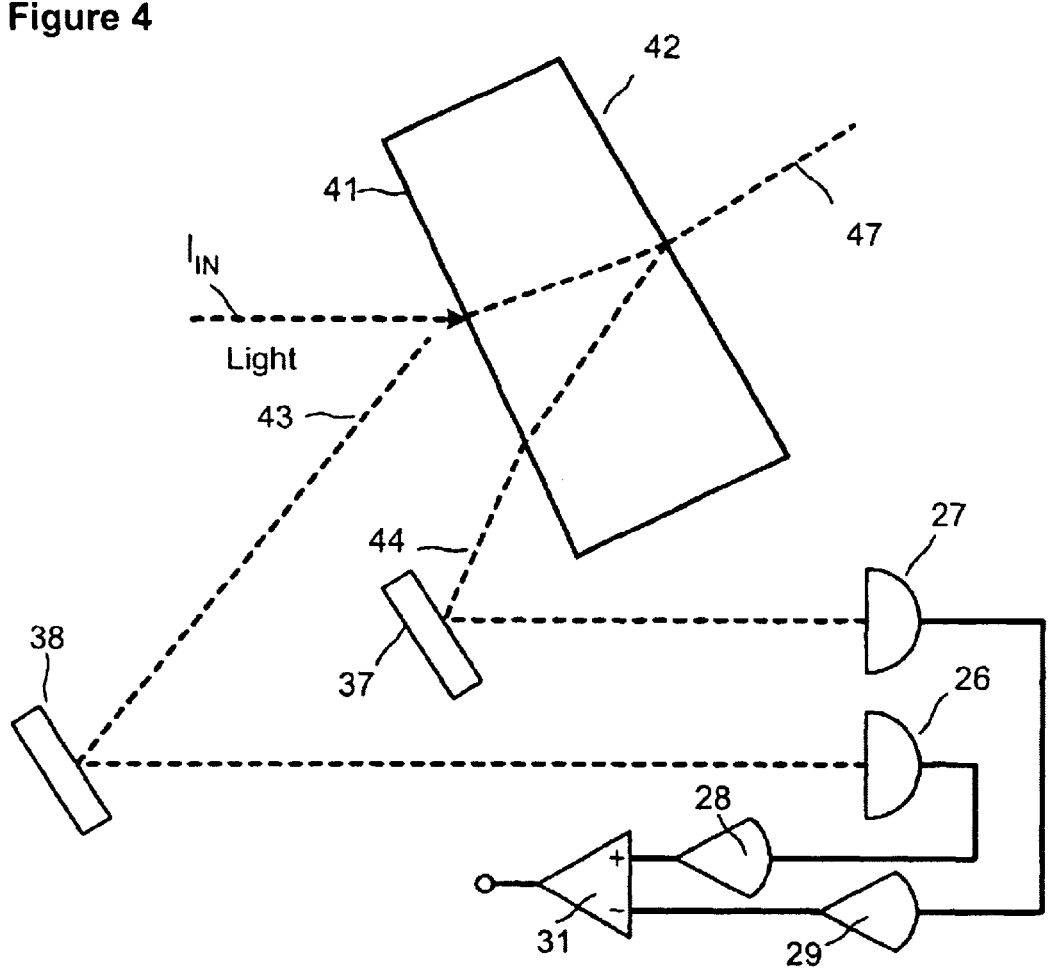
FIG. 5 is a schematic diagram of a detector for measuring wavelength including a wedged beamsplitter.
Figure 6:
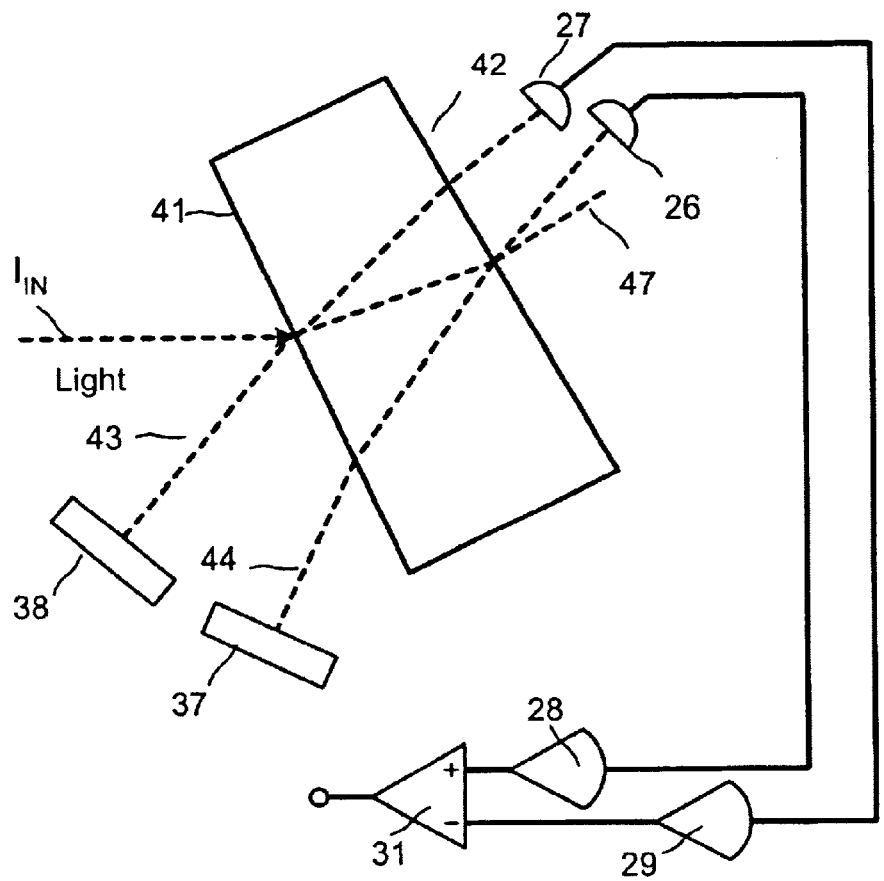
FIG. 6 is a schematic diagram of another detector for measuring wavelength including a wedge beamsplitter.

This polarization disparity may seem to be a problem, but it can be controlled. FIGS. 5 and 6 show two optical configurations for a wedged beamsplitter having a reflective back surface 42 in which the beamsplit ratio for s- and p-polarizations can be controlled or adjusted. The angle of the back surface 42 of the beamsplitter 41 with respect to the front surface can be used to either minimize or maximize the disparity between the split ratios. When the angle of the wedge on the back face 42 of the beamsplitter is adjusted to minimize the disparity, the device can be used as a wavelength sensor. This is achieved by using 37 to reflect the shorter laser wavelengths more strongly than the longer wavelengths, and 38 to reflect the longer wavelengths more strongly than the shorter wavelengths. In FIG. 5, the reflectors 37 and 38 reflected light 43 from the front surface to the reflector 38 and from the angled back surface 42 to the reflector 37. The light reflected by the reflectors 37 and 38 are received by photodetectors 27 and 26, respectively. The log amplifiers 28 and 29 receive the output of the detectors and provide a log of the current received from the photodetector. The outputs of the log amplifiers is applied to difference amplifier 31. When the angle of the wedge on the back face of the beamsplitter is adjusted to maximize the disparity, the device can be used as a polarization sensor. This is achieved by using 37 and 38 to reflect all the laser wavelengths equally.

Figure 8:
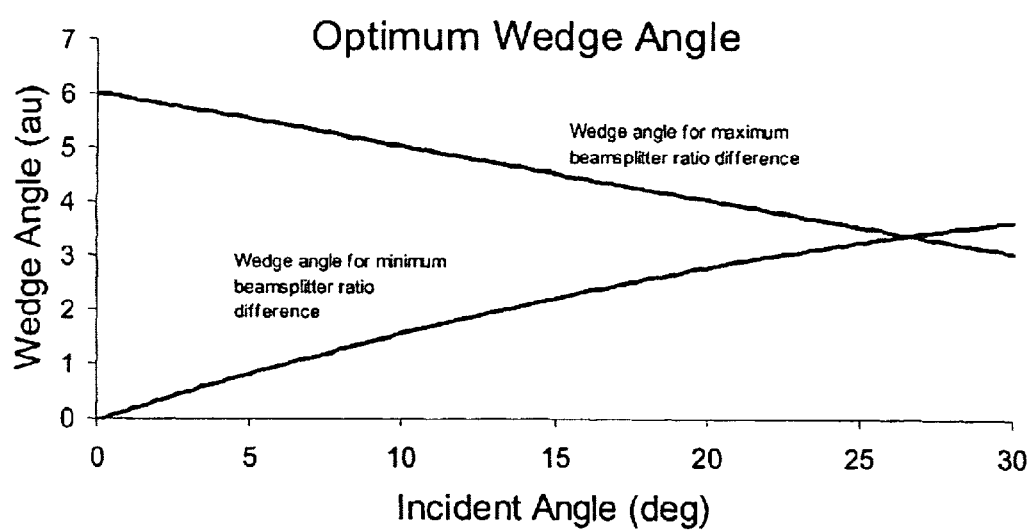
FIG. 8 shows the wedge angle to choose as a function of incident signal angle to a wavelength sensor or a polarization sensor.

FIG. 8 shows the wedge angle to choose as a function of incident angle that optimizes for either wavelength sensing or polarization sensing.

Figure 9:
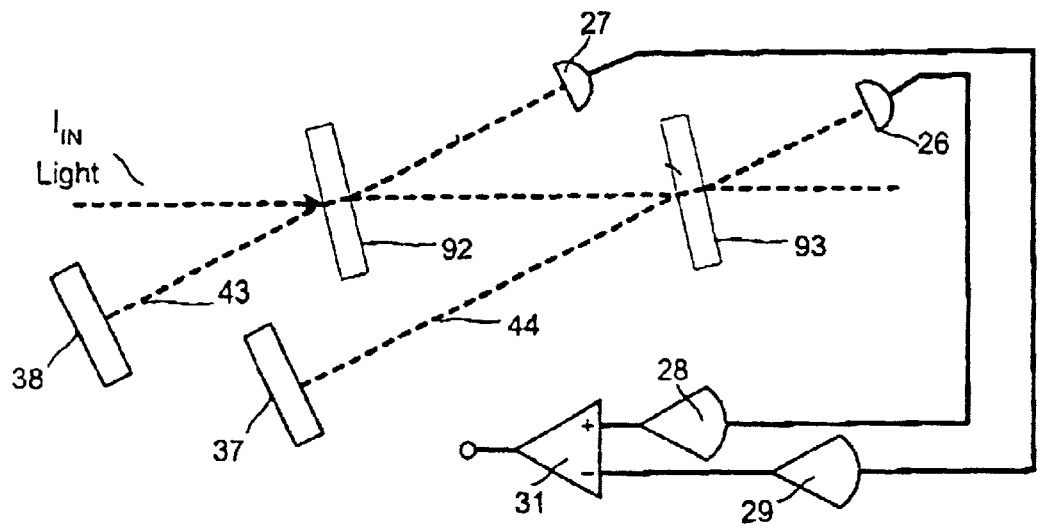
FIGS. 9 and 10 are schematic diagrams of detectors in which two beamsplitters replace the wedge beamsplitters of FIGS. 5 and 6.
Figure 10:
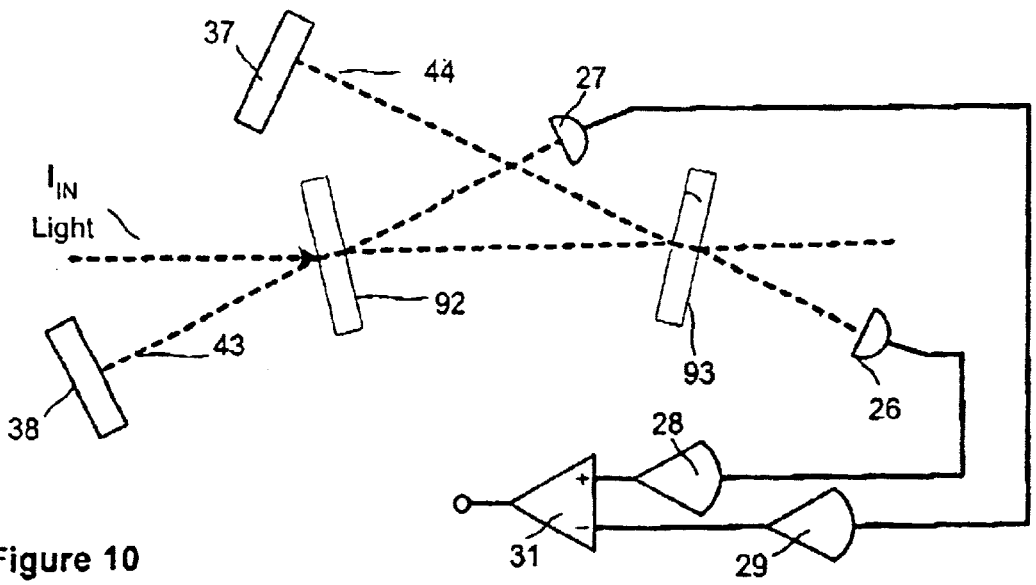

Rather than using a wedge beamsplitter, one can use two beamsplitters 92 and 93, FIGS. 9 and 10. The first surface of the beamsplitter 92 reflects the light 43 into reflector 38 and the front surface of the second beamsplitter 93 which is disposed at an angle reflects light onto the reflector 37. The reflected light is detected by photodetectors 26 and 27, log amplified by log amplifiers 28 and 29, and applied to difference amplifier 31. The back surfaces of the beamsplitters 92 and 93 are preferably coated with an anti-reflection coating. The difference between FIGS. 9 and 10 shows that the beamsplitter 93 can be rotated about a horizontal plane and give the same results.

Thus, there has been described an optical beamsplitter which is configurable in such as way as to produce an inexpensive wavelength sensor which can be miniaturized and which accurately measures wavelength without having to know the approximate wavelength in advance. The wavelength detector can be used to lock the wavelength output of an optical source and it can be used to measure wavelength fluctuations in an optical source. Also described is an inexpensive polarization sensor which can be miniaturized and which accurately measures the polarization field without having to destroy the field.

The foregoing descriptions of specific embodiments of the present invention are presented for the purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A wavelength detector for detecting the wavelength of an incident optical signal comprising:

beamsplitter means for receiving the incident optical signal and reflecting it in two paths from two surfaces angled with respect to one another, filter means for receiving the reflected optical signals and providing optical signals in two optical paths in at least one of which the intensity of the optical signal varies with wavelength, photodetectors for receiving the optical signal in each of said paths and providing an output electrical signal representative of the intensity of the optical signal in each of said paths, log circuits for receiving the output electrical signals and providing the log of such signals, and a subtracting circuit for receiving the log of said output signals and providing an output indicative of the wavelength of the incident optical signal.

2. A wavelength detector as in claim 1 in which said filter means comprises first and second filters, one in each optical path, said filters each having reflecting or transmission characteristics which vary with wavelength.

3. A wavelength detector as in claim 1 in which said beamsplitter means comprises a wedge-shaped beamsplitter wherein the incident beam is reflected in the two paths, one from the front surface and one from the angled back surface.

4. A wavelength detector as in claim 1 in which the beamsplitter means comprises first and second beamsplitters with the front surface of said beamsplitters disposed at an angle with respect to one another wherein the incident beam is reflected in the two paths, one from the front surface of the first beamsplitter and one from the front surface of the second beamsplitter.

5. A wavelength detector as in claim 4 or a polarization detector as in claim 8 in which the back surface of the beamsplitters are provided with an anti-reflective coating.

6. A polarization sensor for detecting the polarization of an incident optical signal comprising:

beamsplitter means for receiving the incident optical signal and reflecting it in two paths from two surfaces which are disposed at an angle with respect to one another, filter means for receiving the reflected optical signals and providing optical signals in two optical paths in at least one of which the intensity of the optical signal varies with wavelength, photodetectors for receiving the optical signal in each of said paths and providing an output electrical signal representative of the intensity of the optical signal in each of said paths, log circuits for receiving the output electrical signals and providing the log of such signals, and a subtracting circuit for receiving the log of said output signals and providing an output indicative of the polarization of the incident optical signal.

7. A polarization detector as in claim 6 in which said filter means comprises first and second filters, one in each optical path, said filters each having reflecting or transmission characteristics which are identical to each other, but may vary with wavelength.

8. A polarization detector as in claim 2 in which said beamsplitter means comprises a wedge-shaped beamsplitter wherein the incident beam is reflected in the two paths, one from the front surface and one from the angled back surface.

9. A polarization detector as in claim 6 in which the beamsplitter means comprises first and second beamsplitters with the front surface of said beamsplitters disposed at an angle with respect to one another wherein the incident beam is reflected in the two paths, one from the front surface of the first beamsplitter and one from the front surface of the second beamsplitter.

10. A wavelength detector as in claim 3 or a polarization detector as in claim 8 in which the back surface of the wedge-shaped beamsplitter is provided with an anti-reflective coating.

* * * * *